Patented July 26, 1949

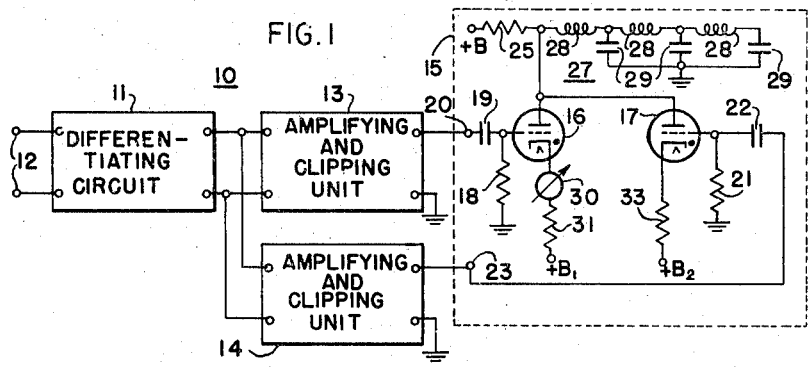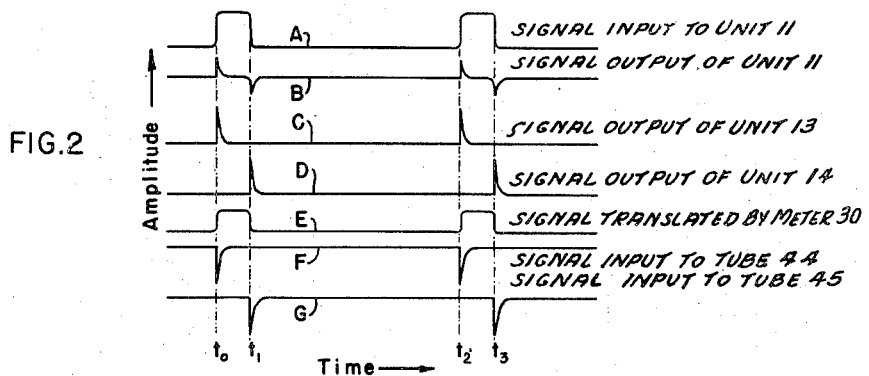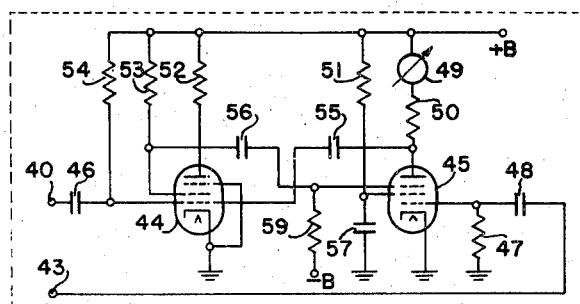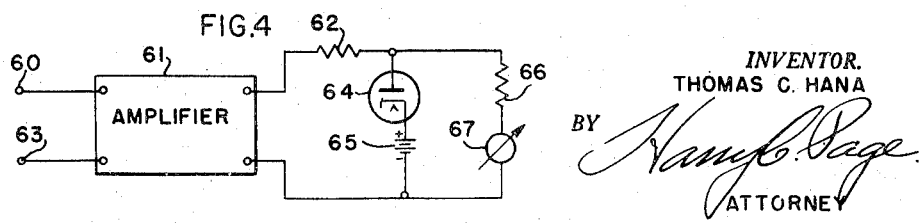

2,477,370

UNITED STATES PATENT OFFICE 2,477,370

ARRANGEMENT FOR MEASURING DUTY CYCLE

Thomas C. Hana, Great Neck, N. Y., assignor to Hazeltine Research, Inc., Chicago, Ill., a corporation of Illinois Application November 22, 1946, Serial No. 711,711

11 Claims. (Cl. 171—95)

This invention relates to arrangements for measuring the duty cycle of recurring pulses having leading and trailing edge portions.

Parallel with the increased use of pulse-modulated wave-signal translating systems for military and civilian purposes in recent years, need has arisen for an arrangement which measures the duty cycle of signals of recurring pulse wave form. Duty cycle may be defined as the ratio of pulse width to pulse-repetition time or, since the pulse-repetition frequency is the reciprocal of the pulse-repetition time, duty cycle may also be expressed as the product of the pulse width and the pulse-repetition frequency.

Power is ordinarily measured as an average value over a relatively long period of time, although the useful power of a pulse-modulated wave-signal translating system such as a transmitter, termed the peak power thereof, is contained in the radiated pulses of radio-frequency energy. Since a pulse transmitter produces a pulse-modulated signal for an interval of time which is short with respect to the period of a single operating cycle, the average power developed by the transmitter is usually low in comparison with the peak power. The ratio of the average power to the peak power of such a transmitter also comprises the duty cycle of the transmitter.

In many pulse-modulated wave-signal translating systems such as transpondor beacons, the peak power is usually fairly constant while the durations and the repetition frequencies of the transmitted pulse-modulated wave signals vary depending upon operating conditions. Such variations alter the average power produced by the system and also the duty cycle thereof. While it may be desirable in a pulse-modulated transmitter to utilize high peak powers to obtain strong signals and a large resulting range, it is also advantageous from an operating standpoint to maintain a low average power in spite of varying repetition rates and pulse durations to avoid overloading tubes and circuit components, thus prolonging the life of those elements and permitting the use of small compact elements in the equipment. A duty-cycle measuring arrangement is, therefore, useful for the purpose of determining whether circuits which translate recurring pulse-type wave signals are being operated safely over a wide range of operating conditions.

It is an object of the invention, therefore, to provide a relatively simple arrangement for measuring the duty cycle of recurring pulses having leading and trailing edge portions.

It is another object of the invention to provide an arrangement for measuring the duty cycle of recurring pulses having closely spaced leading and trailing edges.

It is a further object of the invention to provide a sensitive arrangement for measuring the duty cycle of recurring pulses having leading and trailing edge portions, which arrangement permits the use of a relatively insensitive meter in the circuit thereof.

It is an additional object of the invention to provide an arrangement for measuring the duty cycle of recurring pulses having leading and trailing edge portions and relatively long pulse durations.

In accordance with the invention, an arrangement for measuring the duty cycle of recurring pulses having leading and trailing edge portions comprises a pulse generator responsive both to the leading and the trailing edge portions for deriving therefrom related pulses having substantially constant amplitudes and effectively the same durations and repetition rates as the corresponding recurring pulses. The arrangement also includes a meter responsive to the related pulses for developing an indication which is directly proportional to the durations and the repetition rates of the related pulses to indicate the duty cycle of the recurring pulses.

For a better understanding of the present invention, together with other and further objects thereof, reference is had to the following description taken in connection with the accompanying drawing, and its scope will be pointed out in the appended claims.

Referring now to the drawing, Fig. 1 is a schematic diagram of a complete arrangement in accordance with the invention for measuring the duty cycle of recurring pulses; Fig. 2 is a series of graphs representing various wave forms which are utilized in explaining the operation of the arrangement of Fig. 1; Fig. 3 is a schematic diagram of a portion of a modified form of the invention; and Fig. 4 represents schematically an additional modification of the present invention.

Referring now more particularly to Fig. 1 of the drawing, the arrangement for measuring the duty cycle of recurring pulses having leading and trailing edge portions comprises means for obtaining control pulses from the edge portions of the recurring pulses. This means comprises a wave-shaping network 10 which includes a conventional differentiating circuit 11 having a pair of input terminals 12, 12 and an output circuit which is connected to the input circuit of each of two amplifying and clipping units 13 and 14. The amplifying and clipping unit 13 includes well-known circuits for amplifying pulses of a given polarity and for clipping pulses of the opposite polarity to obtain control or triggering pulses at the initiations of the recurring pulses. Unit 14 is similar to unit 13 and includes conventional circuits for amplifying pulses of the aforesaid opposite polarity and for clipping pulses of the previously mentioned given polarity in order to obtain triggering pulses at the terminations of the recurring pulses.

The arrangement for measuring duty cycle also comprises a means or unit 15 responsive to the control pulses, and hence to the recurring pulses, for deriving therefrom related pulses having substantially constant amplitudes and effectively the same durations and repetition rates as the corresponding recurrent pulses. This means includes a pair of gaseous discharge means, specifically thyratrons 16 and 17, the input circuits of which are connected, respectively, to the output circuits of units 13 and 14. The control electrode of thyratron 16 is connected to ground through a grid-leak resistor 18 and to the ungrounded output terminal of unit 13 through a coupling condenser 19 and an input terminal 20. Similarly the control electrode of thyratron 17 is connected to ground through a grid-leak resistor 21 and to the ungrounded terminal of unit 14 through a coupling condenser 22 and an input terminal 23. The anode of thyratron 16 is connected directly to the anode of thyratron 17 and is, in turn, connected to a source of potential +B through a resistor 25 which has a relatively high value. Unit 15 also includes an energy-storage means in the form of a transmission-line section 27 which may comprise series-connected inductors 28, 28 and shunt-connected condensers 29, 29. The high-potential terminal of the transmission-line section 27 is connected to the anodes of thyratrons 16 and 17 while the other terminal is grounded. Transmission-line section 27 has a round-trip time-delay characteristic which is greater than the duration of any of the recurring pulses which may be applied to the input terminals 12, 12 of the differentiating circuit 11.

A pair of discharge paths is included for the transmission-line section 27. One of these paths which, under conditions to be explained hereinafter, is effective partially to discharge the transmission-line section 27 includes the anode-cathode path of the thyratron 16 and a series-connected combination in the cathode circuit of the thyratron comprising a relatively insensitive direct-current meter 30, a resistor 31, and a source of potential +$B_1$. The meter 30 is one which is adapted to measure average values and is calibrated to indicate duty cycle directly. The potential of the source +$B_1$ has a lower value than that of the source +B and is poled to maintain the thyratron 16 normally in a nonconducting condition. The remaining path which is employed for subsequently completing the discharge of the transmission-line section 27 includes the space-current path of the thyratron 17 and a cascade-connected combination in the cathode circuit of the thyratron 17 comprising a resistor 33 and a source of potential +$B_2$. The source +$B_2$ has a value which is approximately one-half that of the source +$B_1$ and is poled to maintain the thyratron 17 normally in a nonconducting state.

Considering now the operation of the described duty-cycle measuring arrangement with reference to the graphs of Fig. 2, it will be assumed initially that the transmission-line section 27 is charged to the potential of the source +B and that the thyratrons 16 and 17 are in a nonconductive state. A signal comprising recurring rectangular pulses of the type illustrated in curve A of Fig. 2, the duty cycle of which is to be measured, is applied to the input terminals 12, 12 of the differentiating circuit 11. Since the differentiating circuit 11 is responsive to the leading and the trailing edge portions of the recurring pulses, these pulses are differentiated therein to produce short duration, alternately positive and negative pulses at the output terminals thereof, as illustrated in curve B. Unit 13 amplifies the positive output pulses from the differentiating circuit 11 and clips the negative pulses so that a signal having the wave form illustrated in curve C of Fig. 2 results at the output terminals of unit 13. Unit 14 is effectively responsive only to the negative pulses derived by the differentiating circuit 11 from the trailing edges of the recurring pulses since the positive output pulses from circuit 11 are clipped by unit 14. The derived negative pulses are amplified and reversed in polarity by the unit 14 to produce a signal which has the wave form illustrated in curve D.

At time $t_0$ the positive pulse of curve C is applied to the input circuit of the thyratron 16 and, since it exceeds the critical value of control-electrode cathode voltage or striking potential, it causes ionization to take place in the tube. The transmission-line section 27 commences to discharge at a constant rate through the anode-cathode path of thyratron 16, the meter 30, the cathode resistor 31, and the source +$B_1$. At the time $t_1$ the positive pulse of curve D is applied by unit 14 to the control electrode of thyratron 17 and the gas therein also becomes ionized so that the thyratron 17 is rendered conductive. As a result, a low-impedance path between the anode of thyratron 16 and the source +$B_2$ is provided. Because of this low-impedance path and also because the source +$B_2$ is at a materially lower potential level than the source +$B_1$ in the cathode circuit of the first thyratron 16, the anode of thyratron 16 falls to a potential which is lower than that of its cathode. Consequently, the flow of space current through the thyratron 16 and the meter 30 abruptly ceases.

The completion of the discharge of the transmission-line section 27 is then effected through the anode-cathode path of tube 17. After deionization is complete in the thyratron 17, the transmission-line section 27 is charged from the source +B to its initial value through the resistor 25 at a rate determined by the value of the resistor 25 and the effective capacitance of the condensers 29, 29. Unit 15 is then at its original condition and, when actuated at times $t_2$ and $t_3$ by additional control pulses of the type illustrated in curves C and D of Fig. 2, repeats the above-described cycle of operation.

As a result of the action of the wave-shaping arrangement 10 and the conductance variations effected in the thyratron 16, rectangular pulses having steep leading and trailing edges, as illustrated in curve E of Fig. 2, are translated by the thyratron 16 and the meter 30. Since these pulses are derived from the recurring pulses of curve A, the pulses applied to the meter 30 are related to the recurring pulses of curve A. The uniform discharge characteristic of transmission-line section 27 results in the translation of pulses having substantially constant amplitudes by the meter 30. In view of the fact that the edge portions of the pulses of curve E effectively correspond in time with the corresponding leading and trailing edges of the recurring pulses of curve A, the durations of the current pulses which are applied to the meter 30 are directly proportional to the durations of the recurring pulses. Additionally, the pulses which are applied to the meter 30 are directly proportional to the repetition frequency of the recurring pulses since a pulse is translated by the meter for every recurring pulse which is applied to terminals 12, 12 of the differentiating circuit 11. Since the amplitudes of the related pulses are substantially constant, the meter 30, which measures the average value of the related pulses over individual periods thereof, indicates the product of pulse duration and pulse-repetition frequency and, hence, the duty cycle of the recurring pulses.

In view of the fact that related pulses of relatively large energy content are translated by the thyratron 16 and applied to the meter 30, a relatively insensitive meter is effective to provide an accurate indication of the duty cycle of the recurring pulses applied to the arrangement. The described arrangement is particularly well adapted to respond to pulses having steep leading and trailing edges and is also capable of measuring the duty cycle of pulses of extremely short durations. It will be evident that the frequency of the recurring pulses which may be measured by the above-described arrangement is determined by the deionization time of the thyratrons, particularly the second thyratron 17 and the time constant of the charging circuit of the transmission-line section 27. It will also be manifest that the round-trip delay characteristic of the transmission-line section 27 effectively determines the duration of the longest recurring pulse which may be translated by the described duty-cycle measuring arrangement.

A portion of a modified arrangement in accordance with the instant invention which is capable of measuring the duty cycle of recurring pulses of longer durations or of pulses of shorter repetition rates than the Fig. 1 embodiment is illustrated schematically in Fig. 3 of the drawing. The arrangement there represented comprises a multivibrator including a pair of pentode tubes 44 and 45. The input circuit of the pentode 44 is adapted to be connected to the ungrounded output terminal of the amplifying and clipping unit 13 through a coupling condenser 46 and an input terminal 40. The input circuit of the pentode 45, which includes a grid-leak resistor 47 in shunt therewith, is adapted to be connected to the ungrounded output terminal of unit 14 through a coupling condenser 48 and an input terminal 43. A source of potential +B is connected to the anode of the pentode 45 through the series combination of a meter 49 and a resistor 50. This source is also connected to the screen electrode of pentode 45 through a voltage-dropping resistor 51 and to the anode, screen electrode and control electrode of pentode 44 through resistors 52, 53 and 54, respectively. The cathodes of both tubes and the suppressor electrode of the pentode 44 are connected to ground. A condenser 55 is connected between the anode of the pentode 45 and the control electrode of pentode 44 while a similar condenser 56 is connected between the screen electrode of the last-mentioned tube and the suppressor electrode of the pentode 45. The screen electrode of the pentode 45 is connected to ground through a condenser 57 and the suppressor electrode thereof is connected to a source of negative potential −B through a resistor 59.

Considering now the operation of the Fig. 3 modification, it will be assumed initially that the pentode 44 is conducting while the pentode 45 is in a nonconducting state. It will be further assumed that control or triggering pulses similar to those illustrated in curves C and D of Fig. 2, but of opposite or negative polarity, are adapted to be applied to the input terminals 40 and 43 from a wave-shaping arrangement similar to the wave-shaping arrangement 10 of the Fig. 1 embodiment. The application of a negative control signal at time $t_0$, as illustrated in curve F of Fig. 2, to the control electrode of the pentode 44 reduces the flow of space current therein thereby causing the screen electrode to become more positive. This translates a more positive voltage through the coupling condenser 56 to the suppressor electrode of the pentode 45, thus initiating the flow of space current therein. As a result the anode of the pentode 45 becomes more negative and a negative signal is applied to the control electrode of the pentode 44 through the condenser 55 thereby driving the pentode further toward cutoff. This process is cumulative and the tube 44 is driven rapidly to cutoff at time $t_0$ while the tube 45 becomes conductive. At time $t_1$ a negative control pulse, as illustrated in curve G of Fig. 2, is applied to the control electrode of the pentode 45, thus reducing the flow of current therethrough. Consequently the anode potential approaches that of the source +B so that a positive voltage is translated through the coupling condenser 55 to the control electrode of the pentode 44. As a result tube 44 becomes conductive so that the potential on the screen electrode thereof decreases and a negative voltage is translated to the suppressor electrode of the pentode 45 through the coupling condenser 56. Pentode 45 thereupon becomes less conductive and the above-described action becomes cumulative whereupon tube 45 is driven abruptly to cutoff. At time $t_2$ a second negative control pulse is applied to the input circuit of the pentode 44 followed by the application of a similar pulse at time $t_3$ to the control electrode of the pentode 45, and the above-described cycle of operation is repeated. During the intervals in which the pentode 45 is conductive, the meter 49 is actuated by pulses of substantially constant amplitudes similar to those of curve E of Fig. 2 and, as has been previously explained in connection with the Fig. 1 embodiment of the invention, provides an indication representing the duty cycle of the recurring pulses which are applied to the input terminals of the arrangement.

From the above description and explanation of the operation of the Fig. 3 embodiment of the invention, it will be apparent that the multivibrator including the pentodes 44 and 45 comprises the means having two operating conditions which is responsive to triggering pulses which are applied to the input terminals 40 and 43 and is caused thereby to alternate between one operating condition and the other to derive related pulses having substantially constant amplitudes and effectively the same durations and repetition rates as the corresponding recurring pulses. It will also be manifest that the meter 49 comprises a means for utilizing the related pulses for providing an indication which is directly proportional to the durations and the repetition rates of the related pulses to indicate the duty cycle of the recurring pulses.

A still further modification of the instant invention is illustrated in Fig. 4 of the drawing. In this arrangement the input circuit of an amplifier 61 is connected to a pair of input terminals 60 and 63 while the output circuit thereof is connected to a meter 67 through resistors 62 and 66. The series combination of a diode 64 and a biasing source 65, the positive electrode of the latter being connected to the cathode of the diode, is connected in shunt with the series-connected resistor 66 and the meter 67.

In considering the operation of the last-described arrangement, it will be assumed that recurring pulses similar to those illustrated in curve A of Fig. 2 are applied to the input terminals 60 and 63. The recurring pulses are amplified in unit 61 and are applied to the meter 67 through the voltage-dropping resistor 62 and the resistor 66. Recurring pulses which exceed a predetermined amplitude are effective to overcome the bias afforded by the source 65 so that the diode 64 becomes conductive. Consequently, the potentials which exceed this predetermined value appear across the voltage-dropping resistor 62 so that only a signal which is limited to the desired amplitude is applied to the meter 67. Indications afforded by the meter 67 will indicate the duty cycle of the recurring pulses which are applied to the input terminals 60 and 63 of the arrangement.

While several forms of the present invention have been described, for particular applications one embodiment may possess certain desirable advantages over the others. As has been previously mentioned, the arrangement of Fig. 1, which utilizes thyratrons in the circuit thereof, permits the use of a relatively insensitive meter without sacrificing accuracy, thus enabling the over-all cost of the arrangement to be reduced. The multivibrator arrangement of Fig. 3 which, unlike the arrangement of Fig. 1 which utilizes thyratrons, permits the use of two tubes in a single envelope, thus reducing space requirements and simplifying connection problems. The multivibrator arrangement of Fig. 3 also is adapted to accommodate longer pulses or recurring pulses having greater repetition rates. Additionally the last-mentioned type of arrangement permits the use of vacuum tubes, which are characterized by longer life, rather than gas-filled tubes. For some applications the relatively simple arrangement of Fig. 4 is entirely satisfactory.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An arrangement for measuring the duty cycle of recurring pulses having leading and trailing edge portions comprising, a pulse generator responsive both to said leading and trailing edge portions of said recurring pulses for deriving therefrom related pulses having substantially constant amplitudes and effectively the same durations and repetition rates as the corresponding recurring pulses, and a meter effectively responsive to the average value of said related pulses over individual periods of recurrence thereof for developing an indication which is directly proportional to the durations and the repetition rates of said related pulses to indicate said duty cycle of said recurring pulses.

2. An arrangement for measuring the duty cycle of recurring pulses having leading and trailing edge portions comprising, a pulse generator responsive both to said leading and trailing edge portions of said recurring pulses for deriving therefrom related pulses having substantially constant amplitudes and effectively the same durations and repetition rates as the corresponding recurring pulses, and a meter responsive to said related pulses for developing an indication which is directly proportional to the durations and the repetition rates of said related pulses to indicate said duty cycle of said recurring pulses.

3. An arrangement for measuring the duty cycle of recurring pulses having leading and trailing edge portions comprising, means for obtaining control pulses from both said leading and trailing edge portions of said recurring pulses, means responsive to said control pulses for deriving therefrom related pulses having substantially constant amplitudes and effectively the same durations and repetition rates as the corresponding recurring pulses, and a meter responsive to said related pulses for developing an indication which is directly proportional to the durations and the repetition rates of said related pulses to indicate said duty cycle of said recurring pulses.

4. An arrangement for measuring the duty cycle of recurring pulses having leading and trailing edge portions comprising, means for differentiating said recurring pulses to obtain triggering pulses from both said leading and trailing edge portions of said recurring pulses, means having two operating conditions responsive to said triggering pulses and caused thereby to alternate between one operating condition and the other to derive related pulses having substantially constant amplitudes and effectively the same durations and repetition rates as the corresponding recurring pulses, and a meter for utilizing said related pulses to provide an indication which is directly proportional to the durations and the repetition rates of said related pulses to indicate said duty cycle of said recurring pulses.

5. An arrangement for measuring the duty cycle of recurring pulses having leading and trailing edge portions comprising, means for differentiating said recurring pulses to obtain triggering pulses from both said leading and trailing edge portions of said recurring pulses, means including a pair of electron tubes responsive to said triggering pulses for deriving therefrom related pulses having substantially constant amplitudes and effectively the same durations and repetition rates as the corresponding recurring pulses, and a meter responsive to said related pulses for developing an indication which is directly proportional to the durations and the repetition rates of said related pulses to indicate said duty cycle of said recurring pulses.

6. An arrangement for measuring the duty cycle of recurring pulses having leading and trailing edge portions comprising, gaseous discharge means responsive both to said leading and trailing edge portions of said recurring pulses for deriving therefrom related pulses having substantially constant amplitudes and effectively the same durations and repetition rates as the corresponding recurring pulses, and a meter responsive to said related pulses for developing an indication which is directly proportional to the durations and the repetition rates of said related pulses to indicate said duty cycle of said recurring pulses.

7. An arrangement for measuring the duty cycle of recurring pulses having leading and trailing edge portions comprising, gaseous discharge means responsive both to said leading and trailing edge portions of said recurring pulses for deriving therefrom related pulses of relatively large energy content having substantially constant amplitudes and effectively the same durations and repetition rates as the corresponding recurring pulses, and a relatively insensitive direct-current meter responsive to said related pulses for developing an indication which is directly proportional to the durations and the repetition rates of said related pulses to indicate said duty cycle of said recurring pulses.

8. An arrangement for measuring the duty cycle of recurring pulses having leading and trailing edge portions comprising, a pulse generator including a pair of gaseous discharge means responsive both to said leading and trailing edge portions of said recurring pulses for deriving therefrom related pulses having substantially constant amplitudes and effectively the same durations and repetition rates as the corresponding recurring pulses, and a meter responsive to a conductance variation of each of said gaseous discharge means for utilizing said related pulses to develop an indication which is directly proportional to the durations and the repetition rates of said related pulses to indicate said duty cycle of said recurring pulses.

9. An arrangement for measuring the duty cycle of recurring pulses having leading and trailing edge portions comprising, energy-storage means, a pair of discharge paths therefor, switching means responsive both to said leading and trailing edge portions of said recurring pulses for partially discharging said energy-storage means through one of said paths and for subsequently completing the discharge of said energy-storage means through the other of said paths to derive related pulses having substantially constant amplitudes and effectively the same durations and repetition rates as the corresponding recurring pulses, and a meter responsive to said related pulses for developing an indication which is directly proportional to the durations and the repetition rates of said related pulses to indicate said duty cycle of said recurring pulses.

10. An arrangement for measuring the duty cycle of recurring pulses having leading and trailing edge portions comprising, a transmission-line section having a time-delay characteristic greater than the duration of any of said recurring pulses, a pair of discharge paths therefor, switching means responsive both to said leading and trailing edge portions of said recurring pulses for partially discharging said transmission-line section through one of said paths and for subsequently completing the discharge of said transmission-line section through the other of said paths to derive related pulses having substantially constant amplitudes and effectively the same durations and repetition rates as the the corresponding recurring pulses, and a meter responsive to said related pulses for developing an indication which is directly proportional to the durations and the repetition rates of said related pulses to indicate said duty cycle of said recurring pulses.

11. An arrangement for measuring the duty cycle of recurring pulses having leading and trailing edge portions comprising, a transmission-line section, a pair of discharge paths therefor including gaseous discharge means responsive both to said leading and trailing edge portions of said recurring pulses for partially discharging said transmission-line section through one of said paths and for subsequently completing the discharge of said transmission-line section through the other of said paths to derive related pulses having substantially constant amplitudes and effectively the same durations and repetition rates as the corresponding recurring pulses, and a meter in said path for partially discharging said transmission-line section responsive to said related pulses for developing an indication which is directly proportional to the durations and the repetition rates of said related pulses to indicate said duty cycle of said recurring pulses.

THOMAS C. HANA.

REFERENCES CITED

The following references are of record in the file of this patent:

UNITED STATES PATENTS

| Number | Name | Date |
| --- | --- | --- |
| 2,012,837 | Tear | Aug. 27, 1935 |
| 2,228,367 | Sanders | Jan. 14, 1941 |
| 2,266,401 | Reeves | Dec. 16, 1941 |
| 2,421,018 | Rosa | May 27, 1947 |